United States Patent
Nagashima

(10) Patent No.: US 7,662,442 B2
(45) Date of Patent: Feb. 16, 2010

(54) TRIFLUORONAPHTHALENE DERIVATIVE AND LIQUID CRYSTAL COMPOSITION CONTAINING THE SAME

(75) Inventor: Yutaka Nagashima, Saitama (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 239 days.

(21) Appl. No.: 11/816,653

(22) PCT Filed: Feb. 20, 2006

(86) PCT No.: PCT/JP2006/302935

§ 371 (c)(1), (2), (4) Date: Aug. 20, 2007

(87) PCT Pub. No.: WO2006/088177

PCT Pub. Date: Aug. 24, 2006

(65) Prior Publication Data

US 2009/0121186 A1    May 14, 2009

(30) Foreign Application Priority Data

Feb. 21, 2005    (JP) .............................. 2005-043878

(51) Int. Cl.
- *C09K 19/32*    (2006.01)
- *C09K 19/30*    (2006.01)
- *C07C 39/38*    (2006.01)
- *C07C 43/225*    (2006.01)
- *C07C 25/18*    (2006.01)

(52) U.S. Cl. .............. 428/1.1; 252/299.62; 252/299.63; 568/737; 570/183

(58) Field of Classification Search ................. 428/1.1, 428/1.3; 252/299.61, 299.62, 299.63; 568/633, 568/634, 737; 570/183
See application file for complete search history.

(56) References Cited

FOREIGN PATENT DOCUMENTS

| | | |
|---|---|---|
| DE | 19522195 A1 | 12/1995 |
| JP | 2-503441 A | 10/1990 |
| JP | 10-176167 A | 6/1998 |
| JP | 2001-19649 A | 1/2001 |
| JP | 2001-40354 A | 2/2001 |
| JP | 2004-204133 A | 7/2004 |
| JP | 2004-250668 A | 9/2004 |
| JP | 2005-272562 A | 10/2005 |
| JP | 2006124544 | * 5/2006 |

OTHER PUBLICATIONS

English translation by computer for JP 2005-272562, http://www4.ipdl.inpit.go.jp/Tokujitu/PAJdetail.ipdl?N0000=60&N0120=01&N2001=2&N3001=2005-272562, 2005.*
Hiroshi Numata, Monthly Display, vol. 4, No. 3, p. 5, table 4.
International Search Report of PCT/JP2006/302935, date of mailing Mar. 28, 2006.

* cited by examiner

*Primary Examiner*—Shean C Wu
(74) *Attorney, Agent, or Firm*—Westerman, Hattori, Daniels & Adrian, LLP

(57) ABSTRACT

The present invention was realized in order to provide a liquid crystal composition which is negative in dielectric constant anisotropy and having a large absolute value and a display element, and also to provide a compound which is negative in dielectric constant anisotropy and having a large absolute value.

The present invention was realized in order to provide a trifluoronaphthalene derivative expressed by the general formula (I)

[Chemical formula 1]

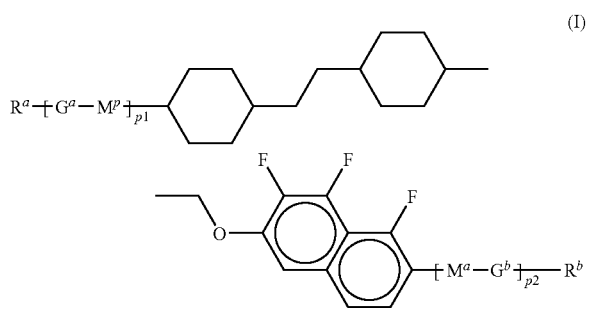

a liquid crystal composition containing the above compound and a display element in which the liquid crystal composition is used. The liquid crystal composition of the present invention has features in which the dielectric constant anisotropy is great in absolute value, and a liquid crystal display element in which the liquid crystal composition is used as a constituting member is useful as a liquid crystal display element based on vertical alignment mode, IPS or others.

12 Claims, No Drawings

TRIFLUORONAPHTHALENE DERIVATIVE AND LIQUID CRYSTAL COMPOSITION CONTAINING THE SAME

TECHNICAL FIELD

The present invention relates to a trifluoronaphthalene-based liquid crystal compound useful as a liquid crystal composition-constituting member, a liquid crystal composition containing a compound which is negative in dielectric constant anisotropy and having a large absolute value, and a liquid crystal display element in which the liquid crystal composition is used.

BACKGROUND ART

Liquid crystal display elements have found wide application due to excellent characteristics such as activation at a low voltage and display on thin devices. Conventional modes for displaying liquid crystal display elements include TN (twisted nematic), STN (super-twisted nematic) and TN-based active matrix (TFT: thin film transistor), all of which have utilized a liquid crystal composition having a positive dielectric constant anisotropy. However, one disadvantage of these display modes is a narrow viewing angle, which is a major problem to be improved in association with an ever increasing demand for larger display panels.

In recent years, as a countermeasure for solving this problem, display modes such as vertical alignment mode and IPS (in-plane switching) have newly come into practical use. The vertical alignment mode is a mode in which vertically-aligned liquid crystal molecules are used to improve a view angle and a liquid crystal composition having a negative dielectric constant anisotropy is used. Further, the IPS is a method in which a transverse electrical field facing horizontally to a glass substrate is used to switch liquid crystal molecules, thereby improving the view angle. In this method, a liquid crystal composition having a positive or negative dielectric constant anisotropy is used. As described above, the vertical alignment mode and the IPS, which are effective in improving the view angle, require a liquid crystal compound negative in dielectric constant anisotropy and a liquid crystal composition. Such a requirement is demanded more strongly than ever before. Conventionally, liquid crystal compositions negative in dielectric constant anisotropy substantially include compounds having 2,3-difluorophenylene groups (Patent Document 1). However, liquid crystal compositions which use these compounds are not sufficiently great in the absolute value of dielectric constant anisotropy, which is a problem (Patent Document 2).

Compounds negative in dielectric constant anisotropy and having a large absolute value include a trifluoronaphthalene derivative, and many other compounds have already been disclosed in general (Patent Document 3). However, producing compounds having a trifluoronaphthalene skeleton is not necessarily easy, and it is not recognized that the compounds are disclosed in the above-described reference documents. Further, in the reference documents, such consideration is given that the compounds are used in a ferroelectric liquid crystal composition. No disclosure is found concerning which compound in such a widely disclosed scope as a nematic liquid crystal composition negative in dielectric constant anisotropy is used in a specific manner, which compound is used together, or what effect is obtained thereby.

On the other hand, a trifluoronaphthalene-based compound and a liquid crystal composition which contains the compound have been known. However, there is no disclosure about a liquid crystal composition in which a compound having a cyclohexylmethoxy group at the 6-position of a naphthalene ring is used (refer to Patent Documents 4, 5 and 6).

Further, based on a finding that compounds having an alkoxy group at the 2-position of a benzene ring and a cyclohexylmethoxy group at the 6-position are chemically unstable and therefore not usable, it has been considered that compounds having an alkoxy group at the 2-position of a naphthalene ring and a cyclohexylmethoxy group at the 6-position thereof are also chemically unstable and not usable as a liquid crystal material. Therefore, the compound concerned was not developed as a liquid crystal material (Non-patent Document 1).

[Patent Document 1]

Japanese Translation of International Application (Kohyo) No. H2-503441 (example on page 8)

[Patent Document 2]

Japanese Published Unexamined Patent Application No. H10-176167 (example on page 10)

[Patent Document 3]

German Patent Application No. 19522195 (manufacturing method on page 12)

[Patent Document 4]

Japanese Published Unexamined Patent Application No. 2001-40354

[Patent Document 5]

Japanese Published Unexamined Patent Application No. 2004-250668

[Patent Document 6]

Japanese Published Unexamined Patent Application No. 2004-204133

[Non-patent Document 1]

Numata, "Trend of liquid crystal materials," Monthly DISPLAY, Vol. 4, No. 3 (page 5), March 1998

DISCLOSURE OF THE INVENTION

The present invention is to provide a liquid crystal composition negative in dielectric constant anisotropy and having a large absolute value and a display element. It is also to provide a compound negative in dielectric constant anisotropy and having a large absolute value.

[Means for Solving Problem]

The inventor has evaluated a trifluoronaphthalene derivative, a nematic liquid crystal composition in which the compound is used and a display element, resulting in the present invention.

The present invention is to provide a trifluoronaphthalene derivative which is expressed by the general formula (I)

[Chemical formula 1]

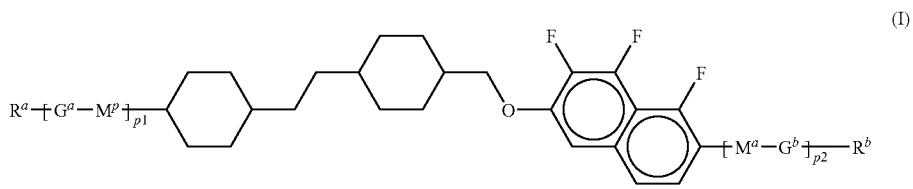

(wherein $R^a$ denotes a linear alkyl group of 1 to 7 carbon atoms or a linear alkenyl group of 2 to 7 carbon atoms. $R^b$ denotes a linear alkyl group of 1 to 7 carbon atoms, a linear alkoxyl group of 1 to 7 carbon atoms, a linear alkenyl group of 2 to 7 carbon atoms or a linear alkenyloxy group of 2 to 7 carbon atoms, $M^a$ and $M^p$ each independently denotes a single bond, —$CH_2CH_2$—, —$OCH_2$—, —$CH_2O$—, —$OCF_2$— or —$CF_2O$—, $G^a$ and $G^b$ each independently denotes a trans-1,4-cyclohexylene group or a 1,4-phenylene group, and p1 and p2 each independently denotes 0 or 1, with a total of p1 and p2 being 0 or 1). The present invention is also to provide a nematic liquid crystal composition negative in dielectric constant anisotropy which contains one or two or more trifluoronaphthalene derivatives expressed by the general formula (I) and one or two or more compounds expressed by the general formula (II)

[Chemical formula 2]

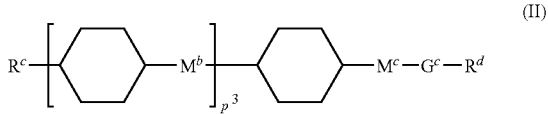

(wherein $R^c$ denotes a linear alkyl group of 1 to 7 carbon atoms or a linear alkenyl group of 2 to 7 carbon atoms, Rd denotes a linear alkyl group of 1 to 12 carbon atoms, a linear alkenyl group of 2 to 12 carbon atoms, a linear alkoxyl group of 1 to 12 carbon atoms or a linear alkenyloxy group of 3 to 12 carbon atoms, p3 denotes 0 or 1, $M^b$ and $M^c$ each independently denotes a single bond, —OCO—, —COO— or —$CH_2CH_2$—, and $G^c$ denotes a trans-1,4-cyclohexylene group or a 1,4-phenylene group), and a liquid crystal display element having the compound(s) as constituting members.

A liquid crystal composition of the present invention has features in which a dielectric constant anisotropy is negative and great in absolute value, and a display element using the composition is useful as a liquid crystal display element for vertical alignment mode, in-plane switching (IPS) and others. Further, a trifluoronaphthalene derivative of the present invention, which is negative in dielectric constant anisotropy and having a large absolute value, is useful as a constituting member of a liquid crystal composition for vertical alignment mode, IPS and others.

BEST MODE FOR CARRYING OUT THE INVENTION

In the general formula (I), $R^a$ is preferably a linear alkyl group of 1 to 7 carbon atoms, and more preferably a methyl, ethyl, propyl, butyl or pentyl group. $R^b$ is preferably a linear alkyl group of 1 to 7 carbon atoms or a linear alkoxyl group of 1 to 7 carbon atoms, more preferably a methyl, ethyl, propyl, butyl, pentyl, methoxy, ethoxy, propoxy, butoxy or pentyloxy group, and even more preferably, a methoxy, ethoxy, propoxy, butoxy or pentyloxy group. Further, p1 and p2 preferably denote 0, and where p2 denotes 1, $M^a$ is preferably a single bond, —$CH_2CH_2$—, —$OCH_2$— or —$OCF_2$—, and more preferably —$CH_2CH_2$— or —$OCH_2$—. Still further, where p1 denotes 1, $M^p$ is preferably a single bond or —$CH_2CH_2$—, and more preferably a single bond. In addition, where p1 or p2 denotes 1, $G^a$ or $G^b$ to be present is preferably a trans-1,4-cyclohexylene group.

More specifically, compounds expressed by the general formula (I) are preferably those expressed by the following general formula (I-1).

[Chemical formula 3]

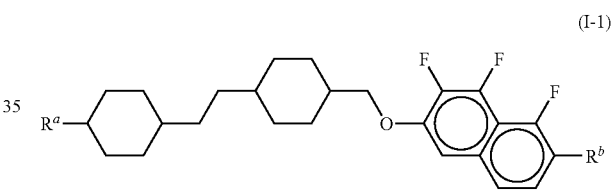

(wherein $R^a$ denotes a linear alkyl group of 1 to 5 carbon atoms, and $R^b$ denotes a linear alkyl group of 1 to 5 carbon atoms or a linear alkoxyl group of 1 to 5 carbon atoms).

In the general formula (II), $R^c$ is preferably a linear alkyl group of 2 to 7 carbon atoms, a 1-alkenyl group of 2 to 5 carbon atoms, or a 3-alkenyl group of 4 to 5 carbon atoms. The linear alkyl group is more preferably an ethyl, propyl, butyl, or pentyl group, wherein the 1-alkenyl group is more preferably a vinyl group or a trans-1-propenyl group and the 3-alkenyl group is more preferably a 3-butenyl group or a trans-3-pentenyl group. $R^d$ is preferably a linear alkyl group of 1 to 7 carbon atoms, a 1-alkenyl group of 2 to 5 carbon atoms, a 3-alkenyl group of 4 to 5 carbon atoms, or a linear alkoxyl group of 1 to 3 carbon atoms. Where $M^b$ is present, it is preferable that at least one of $M^b$ or $M^c$ is a single bond.

Compounds expressed by the general formula (II) are preferably those expressed by the following general formula (II-1) and those expressed by the general formula (II-14). More preferable are compounds expressed by the general formula (II-1), general formula (II-2), general formula (II-3), general formula (II-4), general formula (II-5) or general formula (II-6). Particularly preferable are compounds expressed by the general formula (II-1), general formula (II-3) or general formula (II-6).

[Chemical formulae 4]

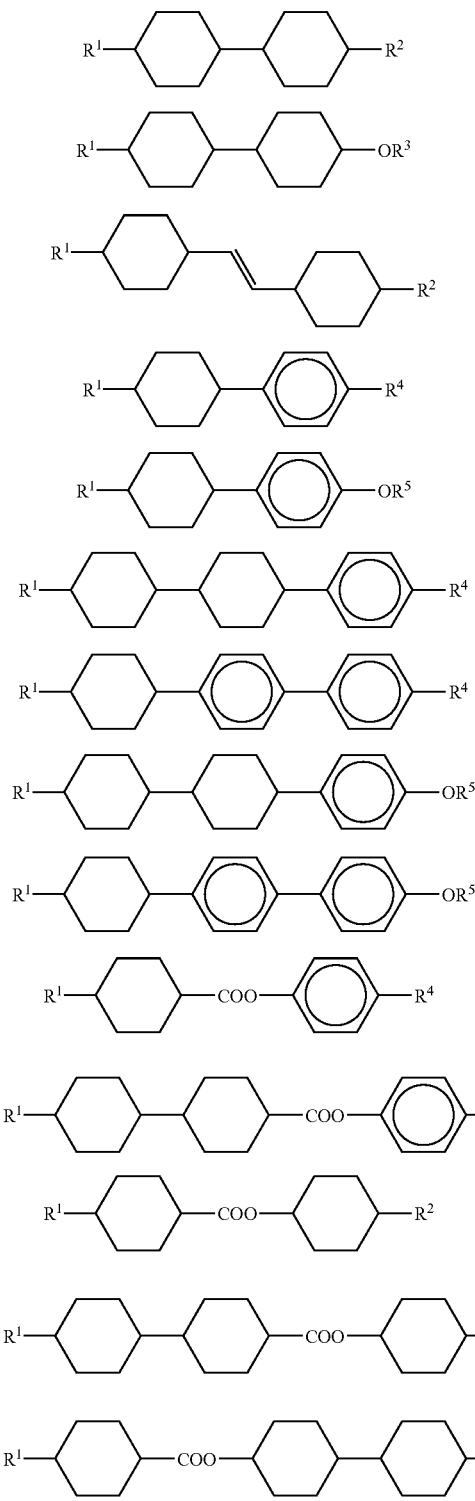

(wherein $R^1$ and $R^2$ each independently denotes a linear alkyl group of 1 to 7 carbon atoms, a 1-alkenyl group of 2 to 3 carbon atoms or a 3-alkenyl group of 4 to 5 carbon atoms, $R^3$ denotes a linear alkyl group of 1 to 5 carbon atoms or a linear 2-alkenyl group of 3 to 4 carbon atoms, $R^4$ denotes a linear alkyl group of 1 to 3 carbon atoms or a 3-alkenyl group of 4 to 5 carbon atoms, and $R^5$ denotes a linear alkyl group of 1 to 3 carbon atoms or a linear 2-alkenyl group of 3 to 4 carbon atoms.

In a liquid crystal composition of the present invention, it is preferable that a compound expressed by the general formula (I) is contained in the composition in the range of 1% by mass (hereinafter, % in the composition means % by mass) or more to 50% or less. The compound is contained preferably in the range of 2% to 40%, and more preferably 4% to 30%. Further, a compound expressed by the general formula (II) is preferably contained in the range of 10% to 70%, and more preferably 20% to 50%.

A liquid crystal composition of the present invention may contain one or two or more 2,3-difluoro-1,4-phenylene derivatives expressed by the general formula (III)

[Chemical formula 5]

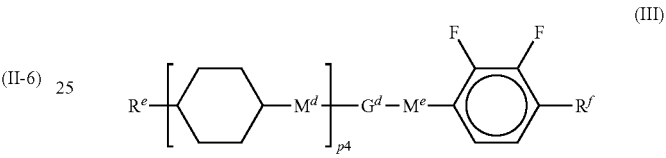

(wherein $R^e$ denotes a linear alkyl group of 1 to 7 carbon atoms, $R^f$ denotes a linear alkyl group of 1 to 7 carbon atoms, a linear alkoxyl group of 1 to 7 carbon atoms or a linear alkenyloxy group of from 3 to 7 carbon atoms, p4 denotes 0 or 1, $M^d$ and $M^e$ each independently denotes a single bond, —$CH_2CH_2$—, —$OCH_2$—, —$CH_2O$—, —$OCF_2$—, —$CF_2O$—, —OCO— or —COO—, and $G^d$ denotes a trans-1,4-cyclohexylene group or a 1,4-phenylene group which may be substituted with one or two fluorine atoms).

In the general formula (III), $R^e$ is preferably a linear alkyl group of 2 to 7 carbon atoms. $R^f$ is preferably a linear alkyl group of 1 to 5 carbon atoms or a linear alkoxyl group of 1 to 5 carbon atoms, in particular, preferably a linear alkyl group of 1 to 4 carbon atoms or a linear alkoxyl group of 1 to 4 carbon atoms. It is preferable that at least either of $M^d$ or $M^e$ is a single bond and the other is a single bond, —$CH_2CH_2$—, —COO— or $CF_2O$.

Many compounds are included in the general formula (III), and preferable are those expressed by the following general formula (III-1) through the general formula (III-7).

[Chemical formulae 6]

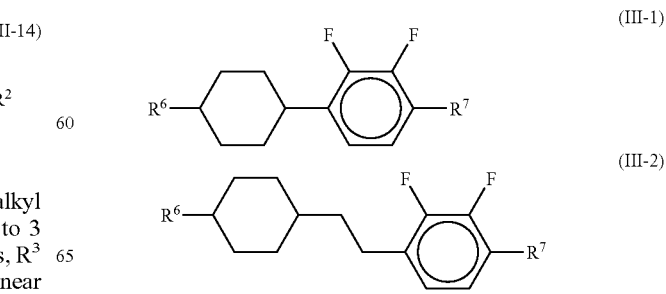

(III-3)

(III-4)

(III-5)

(III-6)

(III-7)

(III-8)

(III-9)

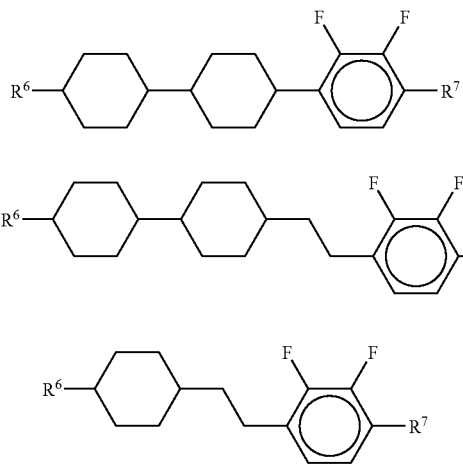

In the above formulae, $R^6$ denotes a linear alkyl group of 2 to 7 carbon atoms, $R^7$ denotes a linear alkyl group of 1 to 5 carbon atoms or a linear alkoxyl group of 1 to 4 carbon atoms.

Further, a liquid crystal composition of the present invention may contain one or two or more compounds expressed by the general formula (IV) through the general formula (VIII)

[Chemical formulae 7]

(IV)

(V)

(VI)

(VII)

(VIII)

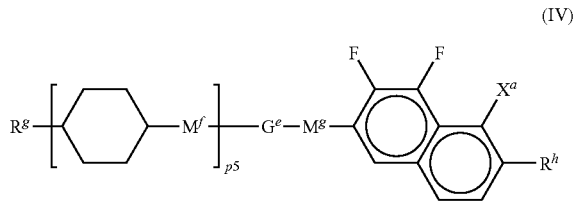

(wherein $R^g$, $R^i$, $R^k$ and $R^m$ each independently denotes a linear alkyl group of 1 to 7 carbon atoms, $R^h$, $R^j$ and $R^n$ each independently denotes a linear alkyl group of 1 to 7 carbon atoms, a linear alkoxyl group of 1 to 7 carbon atoms or a linear alkenyloxy group of 3 to 7 carbon atoms, $R^l$ denotes a linear alkyl group of 1 to 7 carbon atoms, $R^o$ denotes a linear alkyl group of 1 to 7 carbon atoms, a linear alkoxyl group of 1 to 7 carbon atoms, a linear alkenyl group of 2 to 7 carbon atoms or a linear alkenyloxy group of 3 to 7 carbon atoms, $R^p$ denotes a linear alkyl group of 1 to 7 carbon atoms or a linear alkenyl group of 2 to 7 carbon atoms, $X^a$ and $X^b$ each independently denotes a hydrogen atom or a fluorine atom, p5, p6, p7 and p8 each independently denotes 0 or 1, p9 and p10 each independently denotes 0, 1 or 2, a total of p9 and p10 is 1 or 2, $M^f$, $M^g$, $M^h$, $M^i$, $M^j$, $M^k$, $M^l$, $M^m$ and $M^n$ each independently denotes a single bond, —$CH_2CH_2$—, —$OCH_2$—, —$CH_2O$—, —$OCF_2$—, —$CF_2O$—, —OCO— or —COO—, $M^o$ denotes a single bond, —$CH_2CH_2$—, $G^e$, $G^f$, $G^g$, $G^h$, $G^i$ and $G^j$ each independently denotes a trans-1,4-cyclohexylene group or a 1,4-phenylene group which may be substituted with one or two fluorine atoms, and where a plurality of $G^i$, $G^j$, $M^n$ and $M^o$ is present, they may be the same or different from each other).

In the general formula (IV) through the general formula (VIII), $R^g$, $R^i$, $R^k$, $R^m$ and $R^p$ are preferably a linear alkyl group of 2 to 7 carbon atoms. $R^h$, $R^j$, $R^n$ and $R^o$ are preferably a linear alkyl group or a linear alkoxyl group of 1 to 5 carbon atoms. $R^l$ is preferably a linear alkyl group of 1 to 3 carbon atoms. $M^f$ and $M^g$, $M^h$ and $M^i$, $M^j$ and $M^k$, and $M^l$ and $M^m$ each independently denotes a single bond, —$CH_2CH_2$—, —$OCH_2$—, —$CH_2O$—, —$OCF_2$—, —$CF_2O$— or —COO—. It is preferable that one of the pair is a single bond and the other is a single bond, —CH$_2$CH$_2$— or —COO—. M" is preferably a single bond, —CH$_2$CH$_2$—, —CH$_2$O— or —CF$_2$O—.

In the thus obtained liquid crystal composition of the present invention, the nematic phase upper-limit temperature (T$_{N-I}$) thereof is preferably 75° C. or higher and more preferably 75° C. or higher. The nematic phase lower-limit temperature (T$_{>N}$) is −20° C. or lower.

Methods for producing a compound expressed by the general formula (I-1) in the present invention are shown below as examples. As matter of course, the gist of the present invention and the scope of application shall not be restricted by these examples.

(Method 1) Carboxylic acid expressed by the general formula (IX)

[Chemical formula 8]

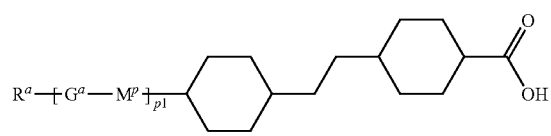

(IX)

(wherein R$^a$, M$^p$, G$^a$ and p1 have the same meaning as in the general formula (I)) is allowed to react with an alcohol in the presence of acid catalysts, thereby obtaining an ester expressed by the general formula (X)

[Chemical formula 9]

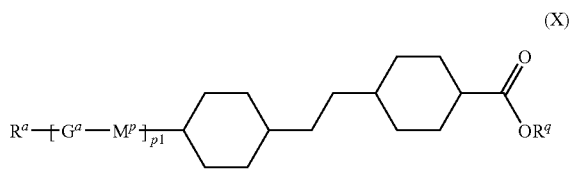

(X)

(wherein R$^a$, M$^p$, G$^a$ and p1 have the same meaning as in the general formula (I) and R$^q$ denotes an alkyl group such as a methyl, ethyl, propyl, butyl, or pentyl group). Thereafter, reducing agents such as lithium aluminum hydride and sodium bis(2-methoxyethoxy)aluminum hydride are allowed to react, thereby effecting reduction, by which an alcohol is obtained which is expressed by the general formula (XI)

[Chemical formula 10]

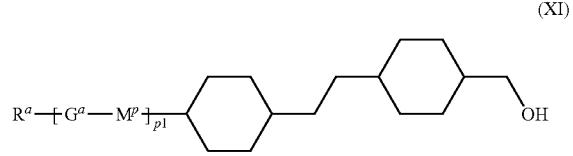

(XI)

(wherein R$^a$, M$^p$, G$^a$ and p1 have the same meaning as in the general formula (I)). Benzenesulfonyl chloride, p-toluenesulfonyl chloride, methanesulfonyl chloride, trifluoromethanesulfonyl chloride or the like are allowed to react therewith in the presence of bases such as pyridine, triethylamine, 4-(N,N-dimethylamino) pyridine and diazabicyclooctane, or hydrobromic acid and hydroiodic acid are allowed to react, thionyl chloride and thionyl bromide are allowed to react, phosphorus trichloride, phosphorus pentachloride, and phosphorus tribromide are allowed to react in an acid atmosphere of sulfuric acid, or carbon tetrachloride and carbon tetrabromide are allowed to react in the presence of triphenylphosphine, thereby obtaining a compound expressed by the general formula (XII)

[Chemical formula 11]

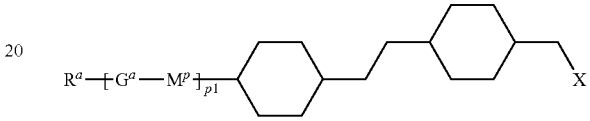

(XII)

(wherein R$^a$, M$^p$, G$^a$ and p1 have the same meaning as in general formula (I), X denotes a leaving group such as chlorine, bromine, iodine, a benzenesulfonyl group, a p-toluenesulfonyl group, a methanesulfonyl group or a trifluoromethanesulfonyl group). The thus obtained naphthol expressed by the general formula (XII) and the general formula (XIII)

[Chemical formula 12]

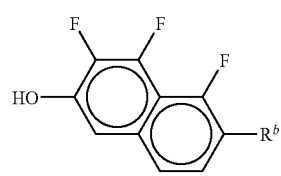

(XIII)

(wherein R$^b$ has the same meaning as in the general formula (I)) is allowed to react in the presence of metallic sodium, metallic potassium, metallic cesium or the carbonate, hydroxide, and hydride thereof, thereby obtaining a compound expressed by the general formula (I).

(Method 2) Ketone (XIV) expressed by

[Chemical formula 13]

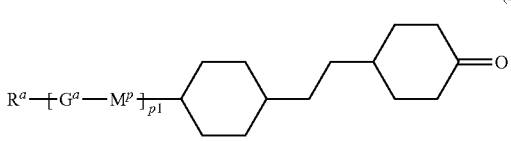

(XIV)

(wherein R$^a$, M$^p$, G$^a$ and p1 have the same meaning as in the general formula (I)) is allowed to react with ylide prepared from methoxymethyltriphenylphosphonium chloride. There after, the resultant is subjected to hydrolysis, thereby obtaining an aldehyde expressed by the general formula (XV)

[Chemical formula 14]

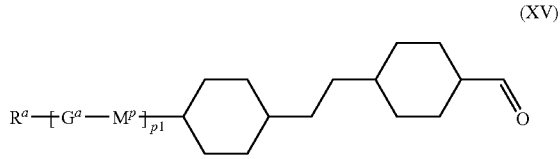

(XV)

(wherein $R^a$, $M^p$, $G^a$ and p1 have the same meaning as in the general formula (I)). The thus obtained aldehyde is allowed to react with reducing agents such as sodium boron hydride, lithium aluminum hydride, sodium bis(2-methoxyethoxy) aluminum hydride, and the like to effect reduction, thereby obtaining an alcohol compound expressed by the general formula (XI)

[Chemical formula 15]

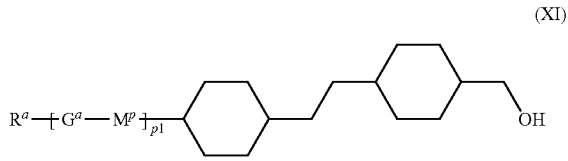

(XI)

(wherein $R^a$, $M^p$, $G^a$ and p1 have the same meaning as in the general formula (I)). The thus obtained alcohol compound is used in place of that obtained in the general formula (XI) in Method 1, the reaction is allowed to be conducted similarly to obtain a compound expressed by the general formula (I).

(Method 3) An alcohol expressed by the general formula (XI)

[Chemical formula 16]

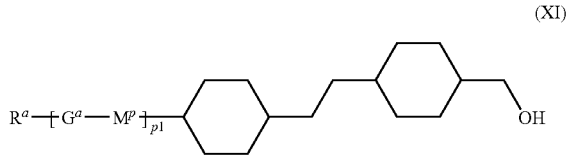

(XI)

(wherein $R^a$, $M^p$, $G^a$ and p1 have the same meaning as in the general formula (I)) and a naphthol expressed by the general formula (XII)

[Chemical formula 17]

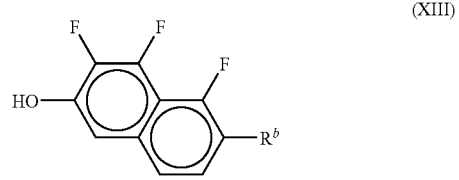

(XIII)

(wherein $R^b$ has the same meaning as in the general formula (I)) are allowed to react in the presence of azodicarboxylate and triphenylphosphine, thereby obtaining a compound expressed by the general formula (I).

(Method 4) In the general formula (I), a compound in which p2 denotes 1 can be produced by using a compound which represents -$M^a$-$G^b$-$R^b$ (wherein $R^b$, $M^a$ and $G^b$ have the same meaning as in the general formula (I)) as $R^b$ in the general formula (XIII) used in the previously described Method 1 through Method 3.

EXAMPLES

Hereinafter, a more detailed description will be made for the present invention by referring to examples. However, the present invention shall not be restricted in any way by these examples. The compounds were confirmed for the structure by using nuclear magnetic resonance (NMR) spectra, mass spectra (MS) and the like. Further, "%" used in the compositions of the following examples and comparative examples means "% by mass."

The following abbreviations are used to describe the compounds.

Me: methyl group
Et: ethyl group
Pr: propyl group
Bu: butyl group
Pen: pentyl group
SBMEA: sodium bis(2-methoxyethoxy)aluminum hydride
Ms: methanesulfonyl group
Py: pyridine Example 1

Synthesis of 7-ethoxy-1,2,8-trifluoro-3-(4-trans-4-(2-(trans-4-propylcyclohexyl)ethyl)cyclohexylmethoxy) naphthalene (I-A)

[Chemical formula 18]

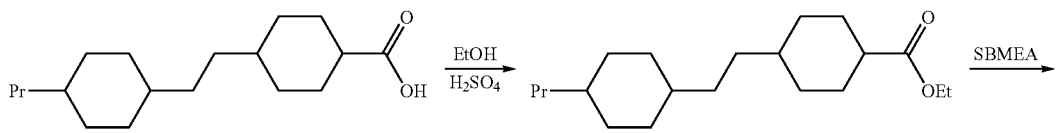

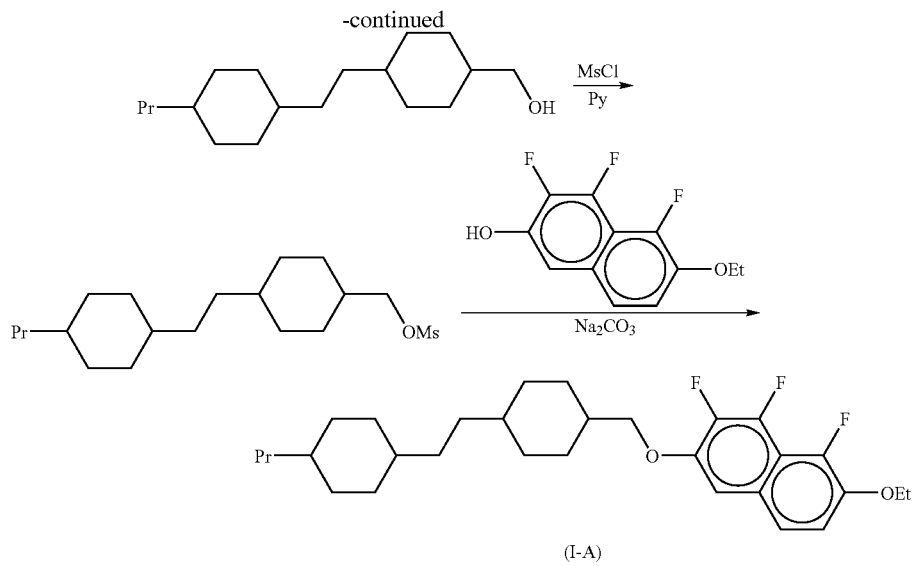

(1-1) Synthesis of ethyl trans-4-(2-(trans-4-propylcyclohexyl)ethyl)cyclohexanecarboxylate Concentrated sulfuric acid (5.0 mL) was added to an ethanol suspension (150 mL) of trans-4-(2-(trans-4-propylcyclohexyl)ethyl)cyclohexanecarboxylic acid (50.0 g), and the resultant was thereafter heated and refluxed for six hours. It was cooled to room temperature to halt the reaction by the addition of water. An organic layer was extracted by using ethyl acetate. The thus collected organic layer was washed by using a saturated sodium bicarbonate aqueous solution and brine in that order, and dried with anhydrous sodium sulphate. Solvents were removed by distillation to obtain a slightly yellow solid of 55.1 g.

(1-2) Synthesis of trans-4-(2-(trans-4-propylcyclohexyl)ethyl)cyclohexyl methanol A 70% sodium bis(2-methoxyethoxy)aluminum hydride toluene solution (60.0 g) was added by titration to a toluene solution (100 mL) of ethyl trans-4-(2-(trans-4-propylcyclohexyl)ethyl)cyclohexanecarboxylate (55.1 g), and thereafter, the resultant was continuously stirred until it cooled down to room temperature due to subdued heating. After the reaction was halted by adding ice water to a reaction solution, toluene was added, and concentrated hydrochloric acid was added until the dissolution of the deposited solid. An organic layer was separated and extracted with toluene from a water layer. Thus collected organic layer was washed by using water, a saturated sodium bicarbonate aqueous solution and brine in that order, and dried with anhydrous magnesium sulphate. Solvents were removed by distillation to obtain a slightly yellow solid of 47.3 g.

(1-3) Synthesis of (trans-4-(2-(trans-4-propylcyclohexyl)ethyl)cyclohexyl)methyl methanesulfonate Methanesulfonyl chloride (15.0 mL) was added by titration under water-cooling conditions to dichloromethane solution (200 mL) of trans-4-(2-(trans-4-propylcyclohexyl)ethyl)cyclohexyl methanol (47.3 g), and then pyridine (17.0 mL) was also added by titration, with the temperature maintained. After being cooled down to room temperature, 4-(N,N-dimethylamino)pyridine (2.6 g) was added, and the resultant was stirred continuously at room temperature for 16 hours. After the reaction was halted by adding 3M hydrochloric acid to a reaction solution, an organic layer was separated and extracted from a water layer by using dichloromethane. The thus collected organic layer was washed by using 3M hydrochloric acid, water, a saturated sodium bicarbonate aqueous solution and brine in that order, and dried with anhydrous magnesium sulphate. Solvents were removed by distillation to obtain a slightly yellow solid. The thus obtained solid was purified by column chromatography (alumina, toluene) and also subjected to recrystallization (toluene/hexane), thereby obtaining a colourless scaly crystal of 51.5 g.

(1-4) Synthesis of 7-ethoxy-1,2,8-trifluoro-3-(4-trans-4-(2-(trans-4-propylcyclohexyl)ethyl)cyclohexylmethoxy)naphthalene (I-A)

Sodium carbonate (4.5 g) was added to N,N-dimethylformamide solution (100 mL) of 6-ethoxy-3,4,5-trifluoro-2-naphthol (10.2 g), and thereafter a tetrahydrofuran solution (50 mL) of (trans-4-(2-(trans-4-propylcyclohexyl)ethyl)cyclohexyl)methyl methanesulfonate (15.0 g) was added thereto by titration. After being heated and refluxed for 10 hours, the resultant was cooled down to room temperature, and the reaction was halted by adding water by titration. An organic layer was extracted with toluene, and the thus collected organic layer was washed with 3M hydrochloric acid, water, a saturated sodium bicarbonate aqueous solution, and brine in that order, and dried with anhydrous magnesium sulphate. Solvents were removed by distillation to obtain a yellow solid. A column chromatography (silica gel, toluene) was used for purification, and the thus obtained solid was subjected to recrystallization (hexane/ethyl acetate), thereby obtaining a white crystal of 6.9 g.

Purity: 99.9% (CC) Phase transition temperature (° C.) Cry 105 N 190 Iso $^1$H-NMR (400 MHz, CDCl$_3$)δ/ppm 0.78-1.36 (m, 18H), 0.87 (t, J=6.8 Hz, 3H), 1.14 (t, J=6.4 Hz, 3H), 1.64-2.02 (m, 10H), 3.88 (d, J=6.0 Hz, 2H), 4.23 (q, J=7.2 Hz, 2H), 6.90 (d, J=7.2 Hz, 1H), 7.21 (t, J=8.4 Hz, 1H), 7.38 (d, J=9.2 Hz, 1H).

Example 2

Synthesis of 1,2,8-trifuoro-7-propoxy-3-(4-trans-4-(2-(trans-4-propylcyclohexyl)ethyl)cyclohexyl-methoxy)naphthalene (I-B)

[Chemical formula 19]

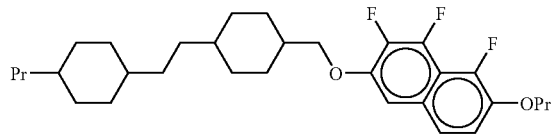

(I-B)

In place of 6-ethoxy-3,4,5-trifluoro-2-naphthol used in Example 1, 3,4,5-trifluoro-6-propoxy-2-naphthol was used to obtain 1,2,8-trifluoro-7-propoxy-3-(4-trans-4-(2-(tans-4-propylcyclohexyl)ethyl)cyclohexylmethoxy)naphthalene.

Phase transition temperature (° C.) Cr 117.5 N 183 I
$^1$H-NMR (400 MHz, CDCl$_3$)δ/ppm 0.78-1.40 (m, 20H), 0.87 (t, J=5.6 Hz, 3H), 1.07 (t, J=7.6 Hz, 3H), 1.65-2.06 (m, 10H), 3.88 (d, J=6.0 Hz, 2H), 4.11 (t, J=6.8 Hz, 2H), 6.90 (d, J=6.8 Hz, 1H), 7.21 (t, J=8.4 Hz, 1H), 7.39 (d, J=8.8 Hz, 1H).

Example 3

Synthesis of 7-butoxy-1,2,8-trifluoro-3-(4-trans-4-(2-(trans-4-propylcyclohexyl)ethyl)cyclohexyl-methoxy)naphthalene (I-C)

[Chemical formula 20]

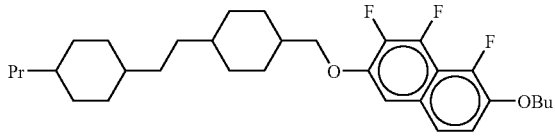

(I-C)

In place of 6-ethoxy-3,4,5-trifluoro-2-naphthol used in Example 1, 6-butoxy-3,4,5-trifluoro-2-naphthol was used to obtain 7-butoxy-1,2,8-trifuoro-3-(4-trans-4-(2-(trans-4-propylcyclohexyl)ethyl)cyclohexylmethoxy)naphthalene.

Phase transition temperature (° C.) Cry 121 N 178 Iso
$^1$H-NMR (400 MHz, CDCl$_3$)δ/ppm 0.79-1.36 (m, 22H), 0.87 (t, J=7.2 Hz, 3H, 0.99 (t, J=7.6 Hz, 3H), 1.66-1.98 (m, 10H), 3.88 (d, J=6.4 Hz, 2H), 4.15 (t, J=6.0 Hz, 2H), 6.89 (d, J=7.2 Hz, 1H), 7.21 (t, J=8.8 Hz, 1H), 7.37 (d, J=8.8 Hz, 1H).

Example 4

Synthesis of 1,2,8-trifluoro-7-propyl-3-(4-trans-4-(2-(trans-4-propylcyclohexyl)ethyl)cyclohexylmethoxy) naphthalene (I-D)

[Chemical formula 21]

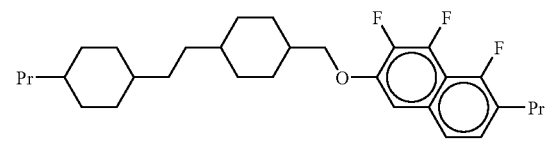

(I-D)

In place of 6-ethoxy-3,4,5-tifluoro-2-naphthol used in Example 1, 6-propyl-3,4,5-trifluoro-2-naphthol was used to obtain 1,2,8-trifluoro-7-propyl 3-(4-trans-4-(2-(trans-4-propylcyclohexyl)ethyl)cyclohexylmethoxy)naphthalene.

Phase transition temperature (° C.) Cry 80 SA 99 N 156 Iso
1H-NMR (400 MHz, CDCl$_3$)δ/ppm 0.79-1.40 (m, 18H), 0.88 (t, J=7.2 Hz, 3H), 1.00 (t, J=7.6 Hz, 3H), 1.66-2.00 (m, 12H), 2.73 (dt, J1=7.2 Hz, J2=2.0 Hz, 2H), 3.90 (d, J=6.4 Hz, 2H), 6.94 (d, J=7.2 Hz, 1H), 7.22 (dd, J1=8.4 Hz, J2=7.2 Hz, 1H), 7.38 (dd, J1=8.4 Hz, J2=2.0 Hz, 1H).

Example 5

Preparation of Liquid Crystal Composition (1)

A host liquid crystal composition (H) was prepared having the following compositions (hereinafter, sometimes referred to as host liquid crystal (H)).

[Chemical formulae 22]

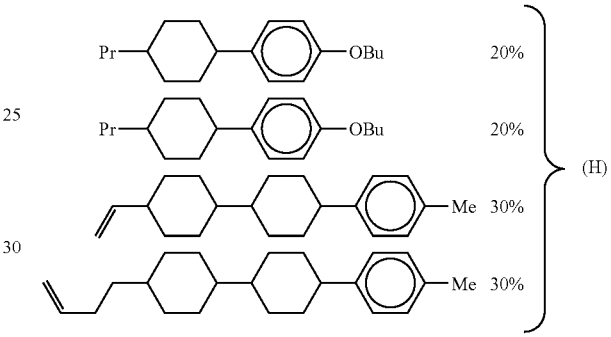

(H)

In this instance, the following are physical values of (H).
Nematic phase upper-limit temperature ($T_{N-I}$): 103.2° C.
Dielectric constant anisotropy (Δ∈): 0.03
Refractive index anisotropy (Δn): 0.099

A liquid crystal composition (M-A) was prepared which was composed of the host liquid crystal (H) (90%) and the compound (I-A) (10%) in Example 1. This composition had the following physical values.
Nematic phase upper-limit temperature ($T_{N-I}$): 111.5° C.
Dielectric constant anisotropy (Δ∈): –0.74
Refractive index anisotropy (Δn): 0.103

The liquid crystal composition (M-A) containing the compound (I-A) of the present invention was greatly decreased in dielectric constant anisotropy (Δ∈) as compared with the host liquid crystal (H) to a negative value. This finding has revealed that the compound (I-A) of the present invention is negative in dielectric constant anisotropy and very having a large absolute value.

Further, the voltage retention of the liquid crystal composition (M-A) was measured at 80° C., which was 98% higher than the voltage retention of the host liquid crystal composition (H) or more. This finding has revealed that the compound (I-A) of the present invention is satisfactorily usable as a liquid crystal display material in view of stability as well.

Example 6

Preparation of Liquid Crystal Composition (2)

A liquid crystal composition (M-B) was prepared which was composed of the host liquid crystal (H) (90%) prepared in Example 5 and the compound (I-B) (10%) in Example 2. This composition had the following physical values.

Nematic phase upper-limit temperature ($T_{N-I}$): 111.5° C.
Dielectric constant anisotropy ($\Delta\varepsilon$): −0.75
Refractive index anisotropy ($\Delta n$): 0.103

The liquid crystal composition (M-B) containing the compound (I-B) of the present invention was greatly decreased in dielectric constant anisotropy ($\Delta\varepsilon$) as compared with the host liquid crystal (H) to a negative value. This finding has revealed that the compound (I-B) of the present invention is negative in dielectric constant anisotropy and very having a large absolute value.

Further, the voltage retention of the liquid crystal composition (M-B) was measured at 80° C., which was 98% higher than the voltage retention of the host liquid crystal composition (H) or more. This finding has revealed that the compound (I-B) of the present invention is satisfactorily usable as a liquid crystal display material in view of stability.

Example 7

Preparation of Liquid Crystal Composition (3)

A liquid crystal composition (M-C) was prepared which was composed of the host liquid crystal (H) (90%) prepared in Example 5 and the compound (I-C) (10%) in Example 3. This composition had the following physical values.
Nematic phase upper-limit temperature ($T_{N-I}$): 111.0° C.
Dielectric constant anisotropy ($\Delta\varepsilon$): −0.73
Refractive index anisotropy ($\Delta n$): 0.103

The liquid crystal composition (M-C) containing the compound (I-C) of the present invention was greatly decreased in dielectric constant anisotropy ($\Delta\varepsilon$) as compared with the host liquid crystal (H) to a negative value. This finding has revealed that the compound (I-C) of the present invention is negative in dielectric constant anisotropy and very having a large absolute value.

Further, the voltage retention of the liquid crystal composition (M-C) was measured at 80° C., which was 98% higher than the voltage retention of the host liquid crystal composition (H) or more. This finding has revealed that the compound (I-C) of the present invention is satisfactorily usable as a liquid crystal display material in view of stability.

Comparative Example 1

Preparation of Liquid Crystal Composition (4)

Prepared was a liquid crystal composition (M-D) composed of the host liquid crystal (H) (90%) prepared in Example 5 and the compound (R-1) (10%) described in Patent Document 1 and expressed by

[Chemical formula 23]

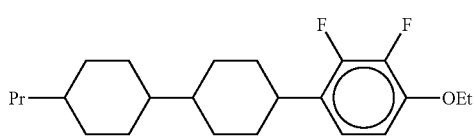

(R-1)

This composition had the following physical values.
Nematic phase upper-limit temperature ($T_{N-I}$): 109.6° C.
Dielectric constant anisotropy ($\Delta\varepsilon$): −0.42
Refractive index anisotropy ($\Delta n$): 0.099

It has been found that the dielectric constant anisotropy of the liquid crystal composition (M-D) containing the compound (R-1) described in Patent Document 1 has an absolute value smaller than that of the liquid crystal composition (M-A) described in Example 5, the liquid crystal composition (M-B) in Example 6 and the liquid crystal composition (M-C) in Example 7, and has a decreased nematic phase upper-limit temperature ($T_{N-I}$).

Comparative Example 2

Preparation of Liquid Crystal Composition (5)

A liquid crystal composition (M-E) was prepared which was composed of the host liquid crystal (H) (90%) prepared in Example 5 and the compound (R-2) (10%) described in Patent Document 4 and expressed by

[Chemical formula 24]

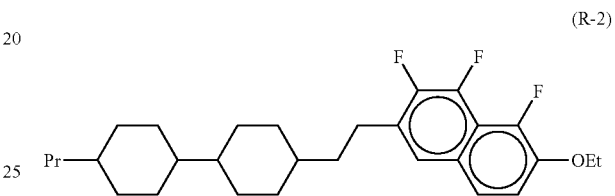

(R-2)

This composition had the following physical values.
Nematic phase upper-limit temperature ($T_{N-I}$): 113.1° C.
Dielectric constant anisotropy ($\Delta\varepsilon$): −0.53
Refractive index anisotropy ($\Delta n$): 0.104

It has been found that the dielectric constant anisotropy of the liquid crystal composition (M-E) containing the compound (R-2) described in Patent Document 1 has an absolute value smaller than that of the liquid crystal composition (M-A) described in Example 4, the liquid crystal composition (M-B) in Example 6 and the liquid crystal composition (M-C) in Example 7.

Example 8

Preparation of Liquid Crystal Composition (6)

A liquid crystal composition (M-F) was prepared which was constituted as follows:

[Chemical formulae 25]

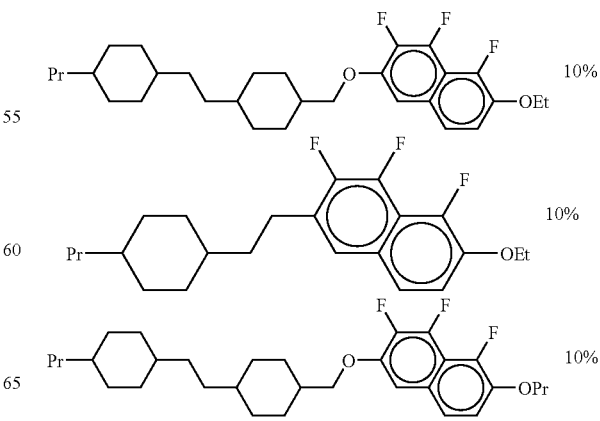

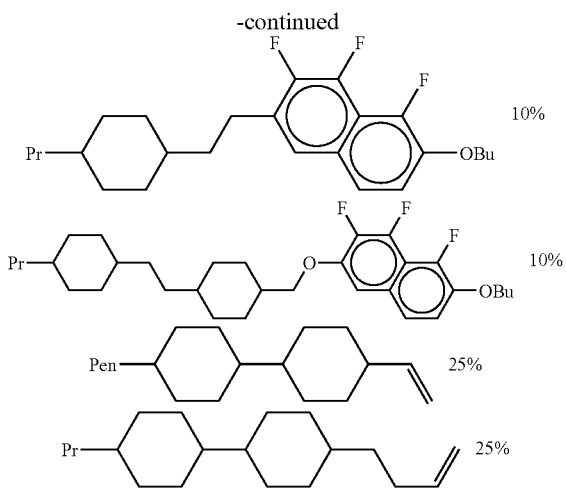

This composition (M-F) had the following physical values.
Nematic phase upper-limit temperature ($T_{N-I}$): 83.1° C.
Dielectric constant anisotropy ($\Delta\epsilon$): –3.60
Refractive index anisotropy ($\Delta n$): 0.096
The thus prepared composition was used to measure the voltage retention, which was 98% at 80° C., a high value. The composition was usable in fabricating a liquid crystal display device excellent in display characteristics.

Example 9

Preparation of Liquid Crystal Composition (7)
A liquid crystal composition (M-G) was prepared which was constituted as follows:
[Chemical formulae 26]

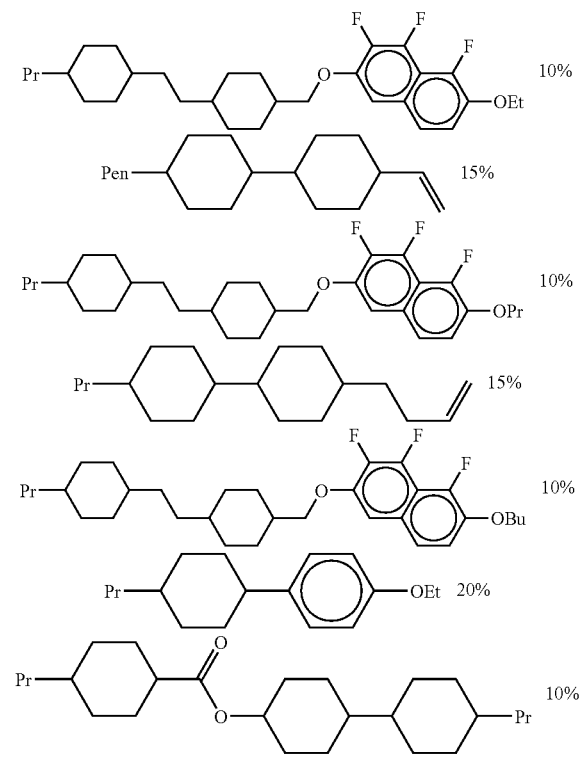

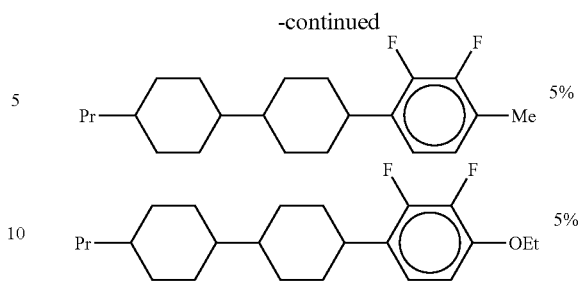

This composition (M-G) had the following physical values.
Nematic phase upper-limit temperature ($T_{N-I}$): 114.5° C.
Dielectric constant anisotropy ($\Delta\epsilon$): –2.81
Refractive index anisotropy ($\Delta n$): 0.092
The thus prepared composition was used to measure the voltage retention which was 98% at 80° C., a high value. The composition was usable in fabricating a liquid crystal display device excellent in display characteristics.

INDUSTRIAL APPLICABILITY

The liquid crystal composition, the display element and the compound described in the present invention are useful constituting members of liquid crystal display elements based on vertical alignment mode, IPS or others.

The invention claimed is:
1. A trifluoronaphthalene derivative which is expressed by the general formula (I)

[Chemical formula 27]

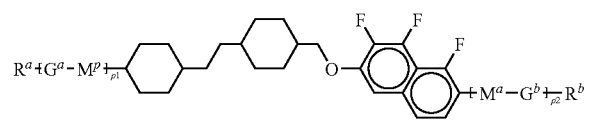

(I)

wherein
$R^a$ denotes a linear alkyl group of 1 to 7 carbon atoms or a linear alkenyl group of 2 to 7 carbon atoms,
$R^b$ denotes a linear alkyl group of 1 to 7 carbon atoms, a linear alkoxyl group of 1 to 7 carbon atoms, a linear alkenyl group of 2 to 7 carbon atoms or a linear alkenyloxy group of 2 to 7 carbon atoms,
$M^a$ and $M^p$ each independently denotes a single bond, —$CH_2CH_2$—, —$OCH_2$—, —$CH_2O$—, —$OCF_2$— or —$CF_2O$—,
$G^a$ and $G^b$ each independently denotes a trans-1,4-cyclohexylene group or a 1,4-phenylene group, and
p1 and p2 each independently denotes 0 or 1, with a total of p1 and p2 being 0 or 1.
2. A trifluoronaphthalene derivative according to claim 1 wherein p1 and p2 denote 0 in the general formula (I).
3. A trifluoronaphthalene derivative according to claim 1 wherein
$R^a$ denotes a linear alkyl group of 1 to 5 carbon atoms, and
$R^b$ denotes a linear alkyl group of 1 to 5 carbon atoms or a linear alkoxyl group of 1 to 5 carbon atoms in the general formula (I).
4. A nematic liquid crystal composition having negative in dielectric constant anisotropy which comprises one or two or more compounds expressed by the general formula (I)

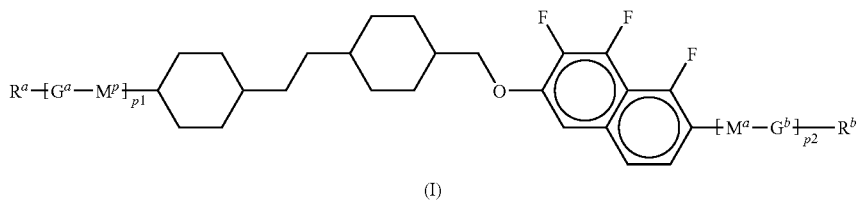

(I)

wherein
- $R^a$ denotes a linear alkyl group of 1 to 7 carbon atoms or a linear alkenyl group of 2 to 7 carbon atoms,
- $R^b$ denotes a linear alkyl group of 1 to 7 carbon atoms, a linear alkoxyl group of 1 to 7 carbon atoms, a linear alkenyl group of 2 to 7 carbon atoms or a linear alkenyloxy group of 2 to 7 carbon atoms,
- $M^a$ and $M^p$ each independently denotes a single bond, —$CH_2CH_2$—, —$OCH_2$—, —$CH_2O$—, —$OCF_2$— or —$CF_2O$—,
- $G^a$ and $G^b$ each independently denotes a trans-1,4-cyclohexylene group or a 1,4-phenylene group, and
- p1 and p2 each independently denotes 0 or 1, with a total of p1 and p2 being 0 or 1; and further comprises one or two or more compounds expressed by the general formula (II)

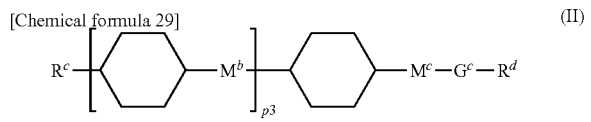

(II)

wherein
- $R^c$ denotes a linear alkyl group of 1 to 7 carbon atoms or a linear alkenyl group of 2 to 7 carbon atoms,
- $R^d$ denotes a linear alkyl group of 1 to 12 carbon atoms, a linear alkenyl group of 2 to 12 carbon atoms, a linear alkoxyl group of 1 to 12 carbon atoms, or a linear alkenyloxy group of 3 to 12 carbon atoms,
- p3 denotes 0 or 1,
- $M^b$ and $M^c$ each independently denotes a single bond, —OCO—, —COO— or —$CH_2CH_2$—, and
- $G^c$ denotes a trans-1,4-cyclohexylene group or a 1,4-phenylene group.

5. A liquid crystal composition according to claim 4 which further comprises one or two or more compounds expressed by the general formula (III)

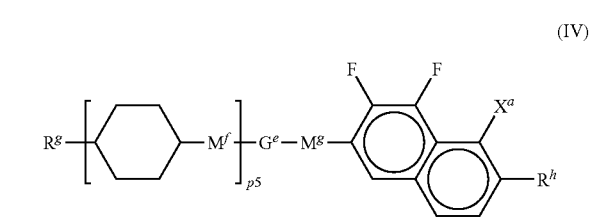

(III)

wherein
- $R^e$ denotes a linear alkyl group of 1 to 7 carbon atoms,
- $R^f$ denotes a linear alkyl group of 1 to 7 carbon atoms, a linear alkoxyl group of 1 to 7 carbon atoms or a linear alkenyloxy group of 3 to 7 carbon atoms,
- p4 denotes 0 or 1,
- $M^d$ and $M^e$ each independently denotes a single bond, —$CH_2CH_2$—, —$OCH_2$—, —$CH_2O$—, —$OCF_2$—, —$CF_2O$—, —OCO— or —COO—, and
- $G^d$ denotes a trans-1,4-cyclohexylene group or a 1,4-phenylene group which may be substituted with one or two fluorine atoms.

6. A liquid crystal composition according to claim 4 which further comprises one or two or more compounds selected from the group consisting of a compound expressed by the general formula (IV), a compound expressed by the general formula (V), a compound expressed by the general formula (VI), a compound expressed by the general formula (VII) and a compound expressed by the general formula (VIII)

(IV)

wherein
- $R^g$ denotes a linear alkyl group of 1 to 7 carbon atoms,
- $R^h$ denotes a linear alkyl group of 1 to 7 carbon atoms, a linear alkoxyl group of 1 to 7 carbon atoms or a linear alkenyloxy group of 3 to 7 carbon atoms,
- $X^a$ denotes a hydrogen atom or a fluorine atom,
- p5 denotes 0 or 1,
- $M^f$ and $M^g$ each independently denotes a single bond, —$CH_2CH_2$—, —$OCH_2$—, —$CH_2O$—, —$OCF_2$—, —$CF_2O$—, —OCO— or —COO—, and
- $G^e$ denotes a trans-1,4-cyclohexylene group or a 1,4-phenylene group which may be substituted with one or two fluorine atoms,
- provided that the following combinations are excluded:
  - $R^g$ denotes a linear alkyl group of 1 to 7 carbon atoms,
  - $R^h$ denotes a linear alkyl group of 1 to 7 carbon atoms, a linear alkoxyl group of 1 to 7 carbon atoms or a linear alkenyloxy group of 3 to 7 carbon atoms,
  - $X^a$ denotes a fluorine atom,
  - p5 denotes 1,
  - $M^f$ denotes —$CH_2CH_2$—,
  - $M^g$ denotes —$CH_2O$—, and
  - $G^e$ denotes a trans-1,4-cyclohexylene group;

formula (V), a compound expressed by the general formula (VI), a compound expressed by the general formula (VII) and a compound expressed by the general formula (VIII)

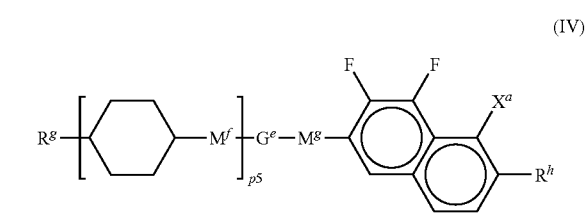
(IV)

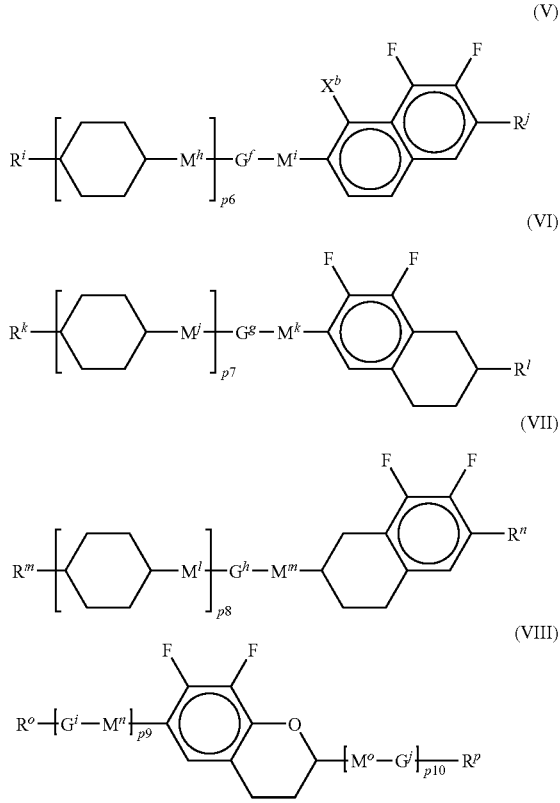

wherein
$R^g$ denotes a linear alkyl group of 1 to 7 carbon atoms,
$R^h$ denotes a linear alkyl group of 1 to 7 carbon atoms, a linear alkoxyl group of 1 to 7 carbon atoms or a linear alkenyloxy group of 3 to 7 carbon atoms,
$X^a$ denotes a hydrogen atom or a fluorine atom,
p5 denotes 0 or 1,
$M^f$ and $M^g$ each independently denotes a single bond, —$CH_2CH_2$—, —$OCH_2$—, —$CH_2O$—, —$OCF_2$—, —$CF_2O$—, —OCO— or —COO—, and
$G^e$ denotes a trans-1,4-cyclohexylene group or a 1,4-phenylene group which may be substituted with one or two fluorine atoms,
provided that the following combinations are excluded:
$R^g$ denotes a linear alkyl group of 1 to 7 carbon atoms,
$R^h$ denotes a linear alkyl group of 1 to 7 carbon atoms, a linear alkoxyl group of 1 to 7 carbon atoms or a linear alkenyloxy group of 3 to 7 carbon atoms,
$X^a$ denotes a fluorine atom,
P5 denotes 1,
$M^f$ denotes —$CH_2CH_2$—,
$M^g$ denotes —$CH_2O$—, and
$G^e$ denotes a trans-1,4-cyclohexylene group;

wherein
$R^i$, $R^k$ and $R^m$ each independently denotes a linear alkyl group of 1 to 7 carbon atoms,
$R^j$ and $R^n$ each independently denotes a linear alkyl group of 1 to 7 carbon atoms, a linear alkoxyl group of 1 to 7 carbon atoms or a linear alkenyloxy group of 3 to 7 carbon atoms,
$R^l$ denotes a linear alkyl group of 1 to 7 carbon atoms,
$R^o$ denotes a linear alkyl group of 1 to 7 carbon atoms, a linear alkoxyl group of 1 to 7 carbon atoms, a linear alkenyl group of 2 to 7 carbon atoms or a linear alkenyloxy group of 3 to 7 carbon atoms,
$R^p$ denotes a linear alkyl group of 1 to 7 carbon atoms or a linear alkenyl group of 2 to 7 carbon atoms,
$X^b$ denotes a hydrogen atom or a fluorine atom,
p6, p7 and p8 each independently denotes 0 or 1,
p9 and p10 each independently denotes 0, 1 or 2,
a total of p9 and p10 is 1 or 2,
$M^h$, $M^i$, $M^j$, $M^k$, $M^l$, $M^m$, and $M^n$ each independently denotes a single bond, —$CH_2CH_2$—, —$OCH_2$—, —$CH_2O$—, —$OCF_2$—, —$CF_2O$—, —OCO— or —COO—,
$M^o$ denotes a single bond or —$CH_2CH_2$—,
$G^f$, $G^g$, $G^h$, $G^i$ and $G^j$ each independently denotes a trans-1,4-cyclohexylene group or a 1,4-phenylene group which may be substituted with one or two fluorine atoms, and
where $G^i$, $G^j$, $M^n$ and $M^o$ are present in plurality, they may be the same or different from each other.

7. A liquid crystal composition according to claim 5 which further comprises one or two or more compounds selected from the group consisting of a compound expressed by the general formula (IV), a compound expressed by the general

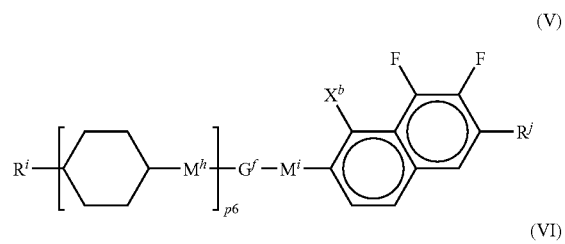
(V)

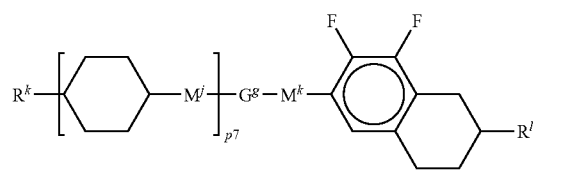
(VI)

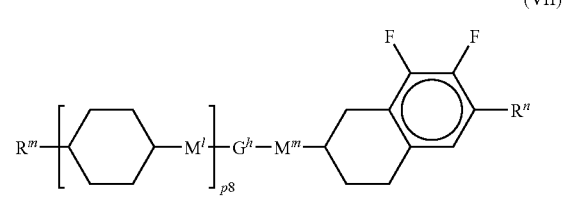
(VII)

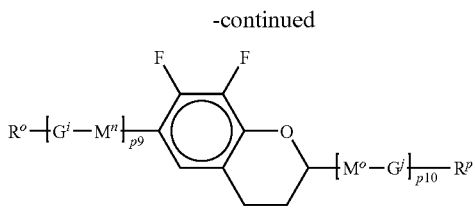

(VIII)

wherein $R^i$, $R^k$ and $R^m$ each independently denotes a linear alkyl group of 1 to 7 carbon atoms, $R^j$ and $R^n$ each independently denotes a linear alkyl group of 1 to 7 carbon atoms, a linear alkoxyl group of 1 to 7 carbon atoms or a linear alkenyloxy group of 3 to 7 carbon atoms, $R^l$ denotes a linear alkyl group of 1 to 7 carbon atoms, $R^o$ denotes a linear alkyl group of 1 to 7 carbon atoms, a linear alkoxyl group of 1 to 7 carbon atoms, a linear alkenyl group of 2 to 7 carbon atoms or a linear alkenyloxy group of 3 to 7 carbon atoms, $R^p$ denotes a linear alkyl group of 1 to 7 carbon atoms or a linear alkenyl group of 2 to 7 carbon atoms, $X^b$ denotes a hydrogen atom or a fluorine atom, P6, p7 and p8 each independently denotes 0 or 1, P9 and p10 each independently denotes 0, 1 or 2, a total of p9 and p10 is 1 or 2, $M^h$, $M^i$, $M^j$, $M^k$, $M^l$, $M^m$, and $M^n$, each independently denotes a single bond, —$CH_2CH_2$—, —$OCH_2$—, —$CH_2O$—, —$OCF_2$—, —$CF_2O$—, —OCO— or —COO—, $M^o$ denotes a single bond or —$CH_2CH_2$—, $G^f$, $G^g$, $G^h$, $G^i$, and $G^j$ each independently denotes a trans-1,4-cyclohexylene group or a 1,4-phenylene group which may be substituted with one or two fluorine atoms, and where $G^i$, $G^j$, $M^n$ and $M^o$ are present in plurality, they may be the same or different from each other.

8. A liquid crystal composition according to claim 7 which comprises two or more compounds expressed by the general formula (III) and further comprises two or more compounds selected from the group of compounds expressed by the general formula (IV), the general formula (V), the general formula (VI), the general formula (VII) and the general formula (VIII).

9. A liquid crystal composition according to claim 8 wherein a nematic phase upper-limit temperature is 70° C. or higher, and a compound expressed by the general formula (I) is contained in a range of 1 to 50% by mass.

10. A liquid crystal display element in which a liquid crystal composition described in any one of claims 4 to 9 is used.

11. A liquid crystal display element according to claim 10 which is subjected to active matrix driving.

12. A liquid crystal display element according to claim 11 which is displayed by a vertical alignment mode.

* * * * *